UNITED STATES PATENT OFFICE.

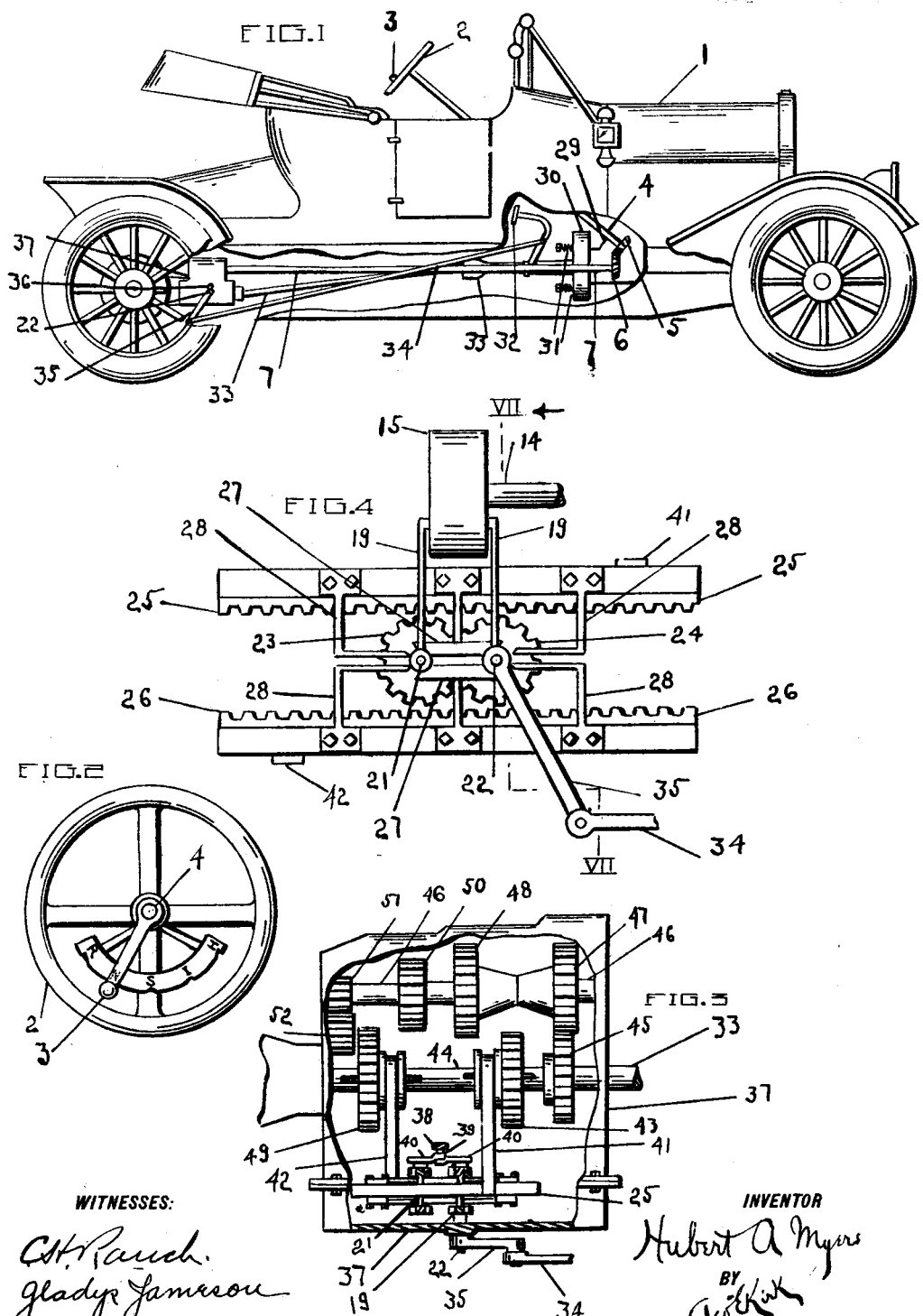

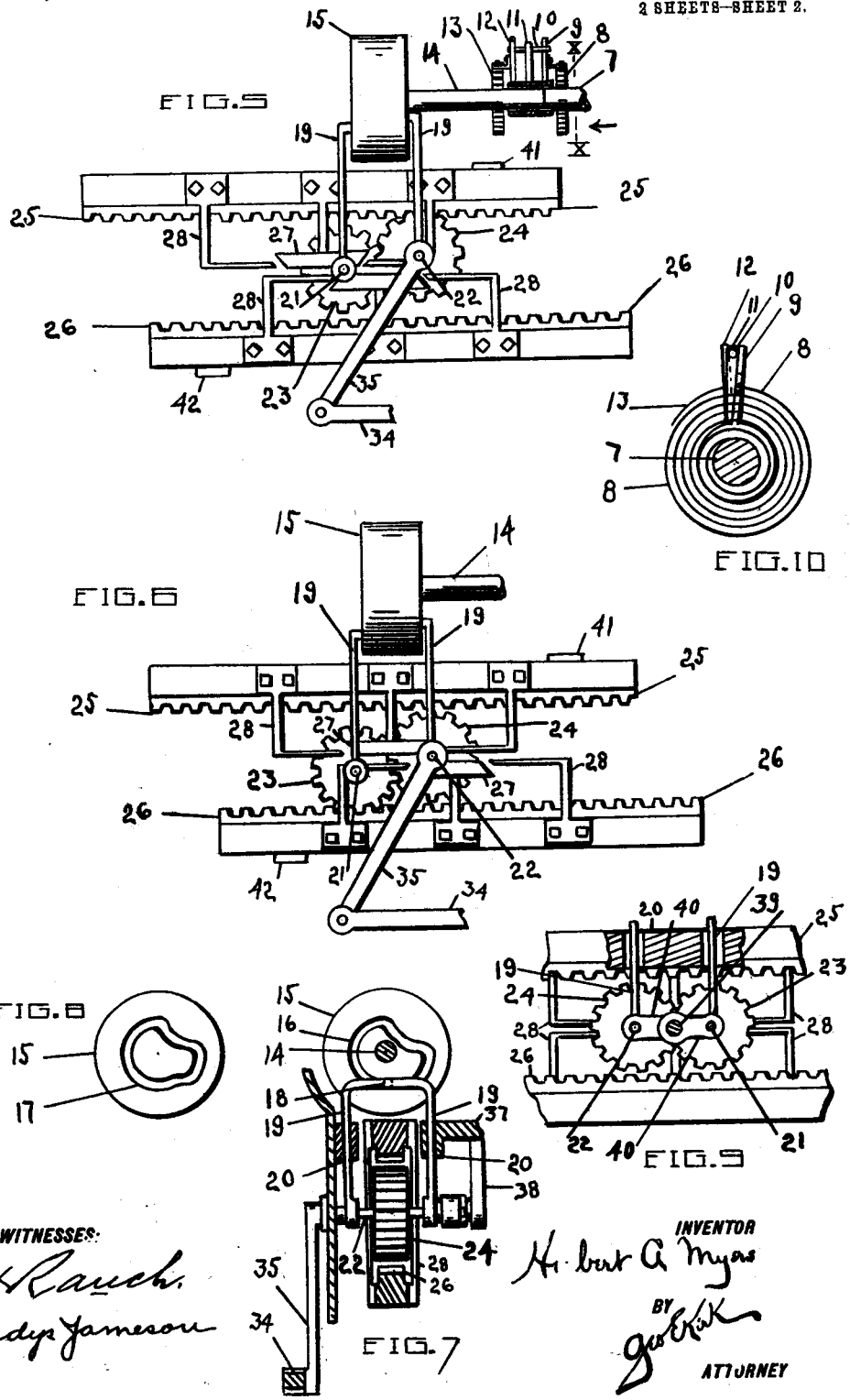

HUBERT A. MYERS, OF TOLEDO, OHIO, ASSIGNOR OF ONE-HALF TO ALBERT A. ATWOOD, OF TOLEDO, OHIO.

MOTOR-VEHICLE GEAR-SHIFTER.

1,107,827.   Specification of Letters Patent.   Patented Aug. 18, 1914.

Application filed November 29, 1913.   Serial No. 803,668.

*To all whom it may concern:*

Be it known that I, HUBERT A. MYERS, a citizen of the United States, residing at Toledo, Lucas county, Ohio, have invented a new and useful Motor-Vehicle Gear-Shifter, of which the following is a specification.

This invention relates to features of control, having special adaptation between a driving and a driven member in connecting for various speed relations.

This invention has utility when embodied in motor vehicle control wherein the handling is made sure and simple.

Referring to the drawings: Figure 1 is a side elevation of the invention as adapted to an internal combustion driven motor vehicle; Fig. 2 is a plan view of the steering wheel, showing the selector arm mounted thereon; Fig. 3 is a plan view on an enlarged scale, with parts broken away, of the invention as connected to the speed changing transmission; Fig. 4 is a side elevation of the shifting mechanism of the invention, on a larger scale than the showing in Fig. 3, and with the parts in disconnected or neutral position; Fig. 5 is a side elevation of the mechanism of Fig. 4 with the parts shifted for intermediate or second speed forward; Fig. 6 is a side elevation of the mechanism of Fig. 4 with the parts shifted for first or low speed forward; Fig. 7 is a section on the line VII—VII, Fig. 4; Fig. 8 is a side elevation of the opposite side of the cam selector from the showing in Fig. 7; Fig. 9 is a fragmentary view of the opposite side of the mechanism from the showing in Fig. 4; and Fig. 10 is a section on the line X—X, Fig. 5, looking in the direction of the arrow.

The motor vehicle 1 is provided with the steering wheel 2 having thereon the selector arm 3 readily manually moved into the several speed relation connecting positions indicated. The arm 3 in shifting actuates the rod 4 and through the bevel gears 5, 6, rotates the selector shaft 7 having yieldable connection to the selector cam. This yieldable connection (Figs. 5, 10) comprises the spiral spring 8 rigidly connected to the shaft 7 and extending to the arm 9 to normally hold the arm 9 against the pin 10 carried by the arm 11. Oppositely abutting the pin 10 is the arm 12 normally held thereagainst by the spiral spring 13 oppositely wound to the spiral spring 8. This spring 13 is fast on the shaft 14 in alinement with the shaft 7. The arms 9, 11, 12, are loosely mounted as to the shafts 7, 14. Fast on the shaft 14 is the cam 15, having on its faces cam grooves 16, 17 (Figs. 7, 8.) These cam grooves 16, 17, are engaged by the pins 18 mounted in the yokes 19. The rotation of the cam causes these yokes to reciprocate in the guide bearings 20, and in these reciprocations carry with them the shafts 21, 22, having mounted thereon the actuator pinions 23, 24. These yokes 19 accordingly serve to hold the pinions 23, 24, in disengaged or non-driving neutral position (Fig. 4) or in the various driving connecting positions by shifting one or the other of said pinions into meshing engagement with the reciprocable shift members or racks 25, 26.

When the actuators 23, 24 are in disconnected or neutral position (Fig. 4), the guides 27, 28, mounted on the rack bars 25, 26, are so disposed that any shifting may occur. The pinion shifted into engagement with a rack passes within a hook 28, which holds such pinion in the mesh relation until return to the neutral position, while the adjacent guide 27 holds the other pinion out of possible mesh relation with the rack bar being driven. These guides are supplementary to the cam grooves in determining the positions of the actuator pinions. The motor 29 (Fig. 1) may drive the clutch member 30. The springs 31, except when disconnected by the action of the clutch pedal 32, maintain the motor 29 in driving relation with the driving shaft 33. Connected to the clutch pedal lever 32 is the link 34 extending to the crank arm 35 fast on the shaft 22 carrying the actuator pinion 24 in mesh relation with the follower actuator pinion 21. To permit the lift of the shaft 22 by the yoke 19, there is slot 36 in the transmission housing 37. To more firmly position the actuator pinions 23, 24 in meshing relation, additional means is provided (Figs. 3, 7, 9). Extending from the housing 37 is the bracket 38 mounting the pin 39 carrying the links 40 extending to the actuator pinion carrying shafts 21, 22. The upper shift bar 25 has the laterally extending arm 41 while the lower shift bar 26 has the laterally extending arm 42. The arm 41 is connected to shift the gear 43 splined on the shaft 44. For high speed driving, the gear 43 is shifted for direct clutch connection with the shaft 33. When oppositely shifted, the arm 41 effects intermediate or second speed driving (Fig. 5). In Fig. 3 the parts are shown in neutral or disconnected position. For intermediate speed, the shaft 33, having fast thereon the gear 45, drives the parallel countershaft 46 through the pinion 47. The power is taken from the shaft 46 by the gear 43 meshing with the gear 48. Low and reverse speeds are controlled by the arm 42 shifting the gear 49 into mesh with the gear 50 for the former, while for the latter, the gear 51 on the shaft 46 drives the follower 52 into mesh with which latter the gear 49 is thrown. The low speed position of the shifting mechanism is shown in Fig. 6.

In operation, selection of any desired speed relation may be made at any time, notwithstanding the yokes 19 are firmly held by the guides 27, 28, locking the cam 15 against rotation, for the yieldable connection allows the arm 3 to be placed and further determines the exact stop position for the cam 15 when it may be free for travel. Thrusting of the pedal 32 forward, releases the clutch 30 from the internal combustion engine, and simultaneously through the link 34 pulls the arm 35 to the position shown in Fig. 4, thus automatically always bringing the shift mechanism to neutral position. As the springs 31 cause the clutch to return to driving position, the recover movement of the pedal 32 rotates the actuators 24, 23, which upon reaching the neutral position had unlocked the cam 15 and were shifted to the selected driving relation. This rotation of the actuators 24, 23, causes the actuator in mesh relation with a rack bar to move such rack bar. The pinion 24 in its driving or shift travel moves the bar 26 to the left and the bar 25 to the right, determining reverse or high speed driving connections. The pinion 23 moves the bar 25 to the left and the bar 26 to the right, determining intermediate or low speed forward driving connections. A movement of the clutch lever 32 to disconnect the clutch from driving relation simultaneously brings the actuators to neutral disconnecting position. With no change in the selector, the clutch upon resetting, has first thrown the shift bar back. The sequence of the clutching of the motor for driving, so closely following the shifting action insures a quick driving connection, which connection may be quite delicately controlled by the operator resisting the recover travel of the lever 32.

What is claimed and it is desired to secure by Letters Patent is—

1. Mechanism for establishing a plurality of driving relations embodying a pair of actuators provided with intermeshing teeth, shifting members having a plurality of shift positions, means for effecting driving connection between an actuator and a member, and driving means for an actuator.

2. Mechanism for establishing a plurality of driving relations embodying a pair of intermeshing actuators, driving means for one of said actuators, a pair of shift members, and means for connecting either actuator with either member.

3. Mechanism for establishing a plurality of driving relations embodying a driving actuator, a follower actuator, shifting members having a plurality of shift positions, and means for connecting either actuator with said shifting members.

4. Mechanism for establishing a plurality of driving relations embodying a driving actuator, a follower actuator, shifting members to be engaged by either actuator, and a selector for the actuator and member to be connected.

5. Mechanism for establishing a plurality of driving relations embodying toothed actuators and shifting members, said actuators intermeshing and movable to additionally intermesh with said shifting members.

6. Mechanism for establishing a plurality of driving relations embodying a driving actuator, a follower actuator, a shifting member having a plurality of shift positions, and means for effecting driving relation between either actuator and the member.

7. Mechanism for establishing a plurality of driving relations embodying a shifting member, rotary actuators therefor, a selector for shifting the actuators, driving means causing the shifted actuator to shift the member, and guiding means to hold the actuators in shifted position while the member is shifted.

8. A motor vehicle gear shifting mechanism embodying two shifting bars, a pair of intermeshing actuators for the bars, and means for connecting either actuator with either bar.

9. In a motor vehicle a pedal, a link extending therefrom, an arm to which the link is connected, an element fast with the arm to be rocked thereby, shifting members, and means movable transversely of the axis of the element for connecting the members of the element for actuation thereby.

10. Mechanism for establishing a plurality of driving relations, actuating means for the mechanism, and a selector for a driving relation of the mechanism, said selector operable independently of the actuating means and including a rotatable member to be actuated, a rotatable actuating member in alinement therewith, and a yielding connection between said members comprising a coaxial element connected to each of the elements and movable relatively thereto.

11. Mechanism for establishing a plurality of driving relations, actuating means for the mechanism, and a selector for the driving relations, said selector including a member to be actuated, an actuating member, an intermediate element, and spring means between the element and each member.

12. Mechanism for establishing a plurality of driving relations, and a selector for the driving relations including a member to be actuated, an actuating member, an intermediate element, and yieldable means between the element and each member.

In testimony whereof I affix my signature in the presence of two witnesses.

HUBERT A. MYERS.

Witnesses:
GEO. E. KIRK,
C. H. RAUCH.

Copies of this patent may be obtained for five cents each, by addressing the "Commissioner of Patents, Washington, D. C."